United States Patent
Chen et al.

(10) Patent No.: US 8,940,145 B1
(45) Date of Patent: Jan. 27, 2015

(54) GRAPHENE-BASED ELECTRODE FOR A SUPERCAPACITOR

(71) Applicant: The United States of America as Represented by the Administrator of the National Aeronautics & Space Administration (NASA), Washington, DC (US)

(72) Inventors: Bin Chen, Palo Alto, CA (US); Meyya Meyyappan, San Jose, CA (US)

(73) Assignee: The United States of America as Represented by the Administrator of the National Aeronautics & Space Administration (NASA), Washington, DC (US)

( * ) Notice: Subject to any disclaimer, the term of this patent is extended or adjusted under 35 U.S.C. 154(b) by 25 days.

(21) Appl. No.: 13/783,112

(22) Filed: Mar. 1, 2013

(51) Int. Cl.
*C25D 13/12* (2006.01)
*B05D 5/12* (2006.01)

(52) U.S. Cl.
USPC .......................... 204/490; 427/79; 427/419.2

(58) Field of Classification Search
USPC .................................. 204/490; 427/79, 419.2
See application file for complete search history.

(56) References Cited

U.S. PATENT DOCUMENTS

| | | |
|---|---|---|
| 2012/0026643 A1 | 2/2012 | Yu et al. |
| 2013/0236785 A1 | 9/2013 | Zhou et al. |
| 2013/0236786 A1 | 9/2013 | Zhou et al. |
| 2014/0098461 A1 | 4/2014 | Zhamu et al. |
| 2014/0111906 A1 | 4/2014 | Eilertsen |

FOREIGN PATENT DOCUMENTS

| | | |
|---|---|---|
| WO | WO2010030361 A1 | 3/2010 |
| WO | WO2011029006 A2 | 3/2011 |

*Primary Examiner* — Kishor Mayekar
(74) *Attorney, Agent, or Firm* — John F. Schipper; Robert M. Padilla

(57) ABSTRACT

A supercapacitor electrode mechanism comprising an electrically conductive, porous substrate, having one or more metallic oxides deposited on a first surface and a chemically reduced graphene oxide deposited on a second surface, to thereby provide an electrical double layer associated with the substrate. The substrate may be carbon paper or a similar substance. The layers of the supercapacitor are optionally rolled into an approximately cylindrical structure.

10 Claims, 3 Drawing Sheets

GRAPHENE-BASED ELECTRODE FOR A SUPERCAPACITOR

ORIGIN OF THE INVENTION

The invention described herein was made in the performance of work under a NASA contract and by an employee of the United States Government and is subject to the provisions of Public Law 96-517 (35 U.S.C. §202) and may be manufactured and used by or for the Government for governmental purposes without the payment of any royalties thereon or therefore. In accordance with 35 U.S.C. §202, the contractor elected not to retain title.

FIELD OF THE INVENTION

This invention relates to nanofabrication of an electrode suitable for use in a supercapacitor.

BACKGROUND OF THE INVENTION

A supercapacitor requires use of a substance that has a relatively high power density, which can be achieved with some materials, and simultaneously a relatively high energy density. Achievement of both of these conditions with a single material has not been possible in the prior art.

SUMMARY OF THE INVENTION

The invention meets these needs by providing a procedure for nanofabrication of an electrode mechanism, for use in a supercapacitor (SC) that has relatively high power density (100-200 KW/Kgm or higher) and simultaneously has relatively energy density (20 KW-hr/KGM or higher). The procedure includes the steps of: (1) providing a porous, electrically conductive substrate that has first and second, spaced apart surfaces; (2) depositing one or more selected metal oxides, including at least one of $MnO_2$ and $Co_3O_4$, on the first substrate surface; and (3) depositing an assembly of chemically reduced graphene oxide (rGO) on the second substrate surface, to thereby provide an electrical double layer associated with the substrate.

DESCRIPTION OF THE INVENTION

Figure 1:
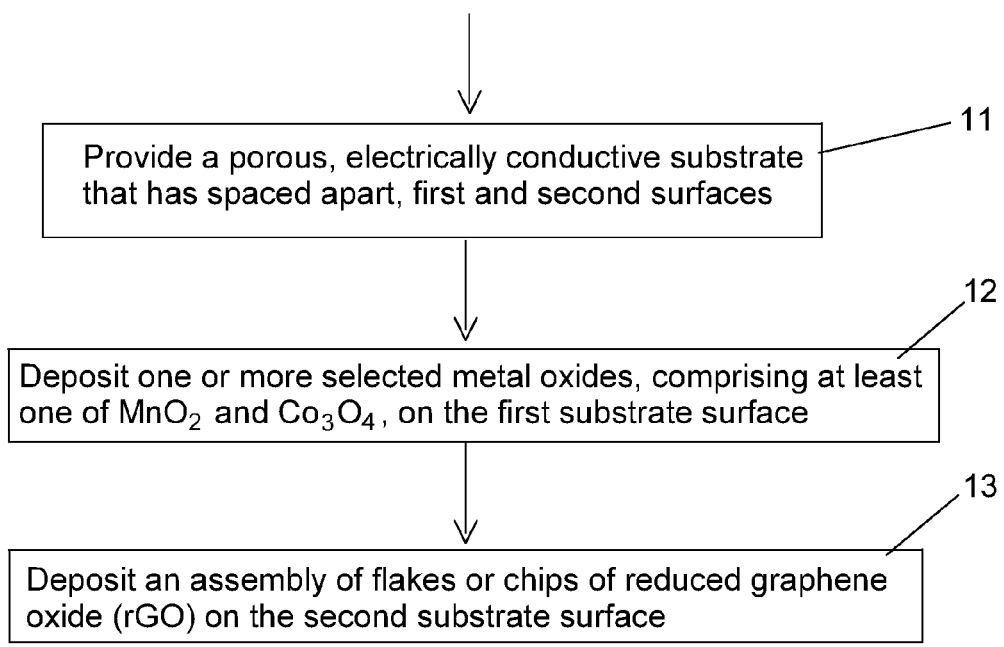
FIG. 1 is a flow chart of a procedure for fabricating an electrode mechanism according to an embodiment of the invention.

FIG. 1 is a flow chart of a procedure for fabricating an electrode mechanism according to an embodiment of the invention. In step 11, a porous, electrically conductive substrate is provided that has spaced apart, first and second, surfaces. The substrate can be a metal, such as stainless steel or thin metal foil, a doped semiconductor, such as Si doped at $10^{19}$ $cm^{-3}$ or higher, carbon paper, such as Toray paper or Bucky paper, an electrically conducting polymer, or a cellulose substance (optionally including photocopy paper) impregnated with a combination of carbon nanotube (CNT) ink and sodium dodecylbenzesesulfonate, the carbon paper having a thickness in a range 500-2000 nm, or another conductive substance.

In step 12, one or more selected metal oxides, including at least one of $MnO_2$ and $Co_3O_4$, is deposited on the first substrate surface. The metal oxide has an associated specific capacity of around 300 Farads/gm.

In a third step 13, an assembly of flakes or chips of reduced graphene oxide (rGO) is deposited on the second substrate surface, with individual flake thicknesses in a range 1-15 μm, depending upon the electrolyte. Deposition of the rGO can, for example, be achieved by deposit of graphene oxide (GO) on the substrate second surface, followed by electrophoretic deposition (EPD), such as cathodic deposition using an electrolyte such as a room temperature ionic liquid (RTIL).

An RTIL is a room temperature, liquid, solvent-free electrolyte. Examples of RTILs are 1-butyl-1-methylpyrrolldinium bis(trifluoromethylsulfonyl)imide, Methyltrioctylammonium bis(trifluoromethylsulfonyl)imide, ammonium ions, and methyl imidazole.

The reducing agent may be hydrazine, sodium borohydride, or a similar substance. The rGO helps provide an electrical double layer associated with the substrate.

Figure 2:
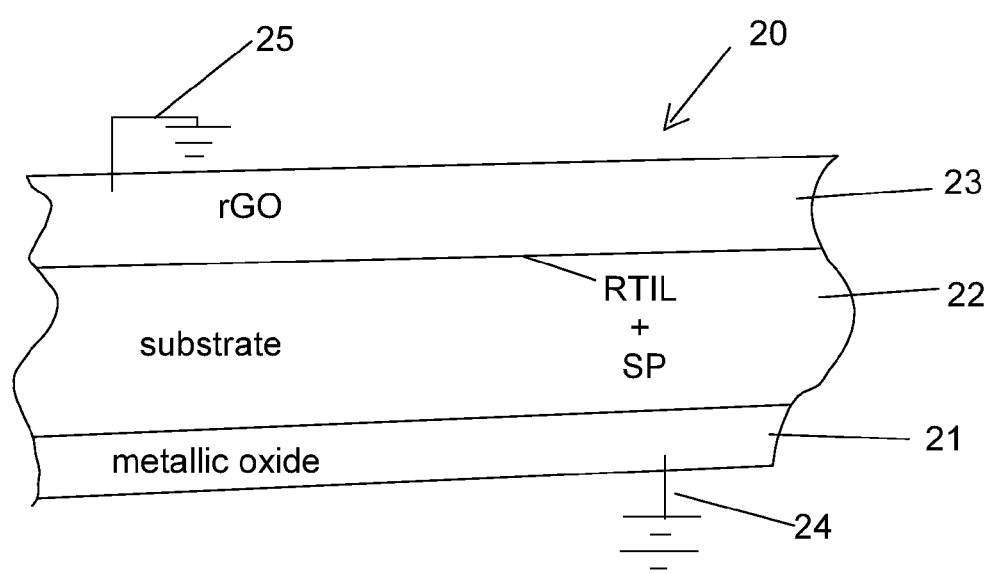
FIG. 2 is a schematic view of a layered embodiment of the invention.

FIG. 2 illustrates a three-layer, substantially planar embodiment 20t of the invention provided by the procedure discussed in FIG. 1, comprising a metallic oxide layer 21, a substrate 22 and an rGO layer 23, with associated electrical terminals 24 and 25. The electrolyte may be an RTIL or a combination of RTIL and a solid polymer (SP) that manifests at least some piezoelectric behavior.

Figure 3:
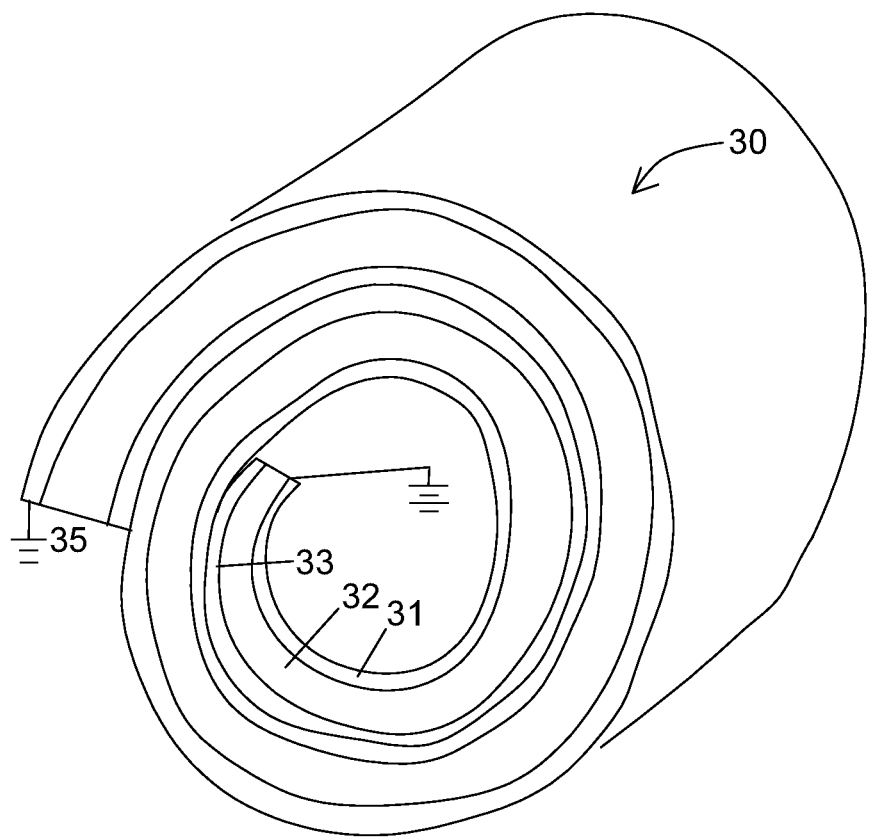
FIG. 3 illustrates a perspective end view of a cylindrical embodiment of the invention.

This fabrication procedure also provides a three-layer (more generally, a multi-layer) cylindrical embodiment 30 in FIG. 3 for storage or transfer of an electrical charge with relatively high power density and energy density. The energy density and power density can be increased substantially by rolling this three-layer system into a 3N-layercylindrical system 30, as indicated in an end view in FIG. 3, with N>>1. In FIG. 3, the geometric structure is illustrated with N approximately equal to 2. The first layer 31 contains metallic oxides, the second layer 32 is a thicker substrate layer, and the third layer 33 includes rGO and a selected electrolyte. The substrate may have a thickness as small as 1-5 μm and as large as 150 μm depending upon the substrate material and the maximum permissible curvature of the geometric structure illustrated in FIG. 3. For a given substrate material, the smaller the substrate thickness, the greater the geometric structure that can be supported without substrate cracking or crazing. The layers illustrated in FIG. 3 are preferably rolled into a structure resembling a cylinder.

In an embodiment, illustrated in FIG. 2 or FIG. 3, the (solid or gel-like) electrolyte comprises a combination of an RTIL and a solid polymer SP, such as polyvinylidene fluoride or difluoride, preferably β-phase.

Ideally, the system should operate at temperatures in a range −40° C.<T<100° C., should operate at voltages in a range −3 to +7 Volts, and should rely upon non-toxic materials for fabrication. The system should be mechanically flexible and have a relatively small form factor.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A method for fabricating a supercapacitor, the method comprising:
   providing an electrically conductive substrate, having spaced apart first and second surfaces;
   providing a layer of metal oxides, including at least one of $MnO_2$ and $Co_3O_4$, contiguous to the first substrate surface; and
   providing a layer of chemically reduced graphene oxide (rGO) contiguous to the second substrate surface, to thereby provide an electrical double layer associated with the substrate.

2. The method of claim 1, further comprising providing, as said conductive substrate, a sheet of carbon paper comprising a cellulose substance impregnated with a combination of carbon nanotube ink and sodium dodecylbenzenesulfonate.

3. The method of claim 2, wherein said carbon paper has an associated capacitance of at least about 200 Farads/gm.

4. The method of claim 1, further comprising providing, as said conductive substrate, at least one of a layer of stainless steel, a thin metal foil and a semiconductor material with a dopant density of at least $10^{19}$ cm$^{-3}$.

5. The method of claim 1, further comprising providing said rGO layer on said second substrate surface by a process comprising depositing a layer of graphene oxide on said second substrate surface, using electrophoretic deposition comprising providing at least one room temperature ionic liquid (RTIL) as an electrolyte for said rGO.

6. The method of claim 1, further comprising providing said rGO layer on said second substrate surface by a process comprising depositing a layer of graphene oxide on said second substrate surface, using electrophoretic deposition comprising at least one room temperature ionic liquid (RTIL) as an electrolyte and at least one solid polymer that manifests piezoelectrical behavior.

7. The method of claim 5, further comprising choosing said room temperature ionic liquid to comprise at least one of methyl imidazole, ammonium ions, 1-butyl-1-methylpyrrolldinium bis(trifluoromethylsulfonylimide, and methyltrioctylammonium bis(trifluoromethylsulfonyl)imide.

8. The method of claim 5, further comprising forming said electrical double layer at an interface between said reduced graphene oxide layer and said electrolyte.

9. The method of claim 1, further comprising providing said reduced graphene oxide using a substance comprising at least one of hydrazine and sodium borohydride as a reducing agent.

10. The method of claim 1, further comprising providing a distribution of said metal oxides in a first layer that serves as a first electrical terminal, providing said substrate in a second layer, providing a distribution of said chemically reduced graphene oxide in a third layer that serves as a second electrical terminal, and forming the first, second and third layers into a cylindrical structure.

* * * * *